(12) United States Patent
Xu

(10) Patent No.: US 11,352,041 B2
(45) Date of Patent: Jun. 7, 2022

(54) BABY STROLLER WITH QUICK FOLDING STRUCTURE

(71) Applicant: Jiahong Xu, Guangdong (CN)

(72) Inventor: Jiahong Xu, Guangdong (CN)

(73) Assignee: Dongguan Master Kids Toy Co., Ltd., Dongguan (CN)

( * ) Notice: Subject to any disclaimer, the term of this patent is extended or adjusted under 35 U.S.C. 154(b) by 526 days.

(21) Appl. No.: 16/421,456

(22) Filed: May 23, 2019

(65) Prior Publication Data
US 2020/0307668 A1    Oct. 1, 2020

(51) Int. Cl.
*B62B 7/06* (2006.01)

(52) U.S. Cl.
CPC .......... *B62B 7/066* (2013.01); *B62B 2205/06* (2013.01); *B62B 2205/26* (2013.01)

(58) Field of Classification Search
CPC ..... B62B 7/064; B62B 7/066; B62B 2205/06; B62B 2205/26
See application file for complete search history.

(56) References Cited

U.S. PATENT DOCUMENTS

| | | | | |
|---|---|---|---|---|
| 6,478,328 B1* | 11/2002 | Yeh | ............................ | B62B 7/08 16/113.1 |
| 6,485,216 B1* | 11/2002 | Cheng | ........................ | B62B 7/06 280/47.36 |
| 8,985,616 B1* | 3/2015 | Chen | ........................ | B62B 7/062 280/642 |
| 9,346,479 B1* | 5/2016 | Ransil | ...................... | B62B 7/064 |
| 9,981,678 B1* | 5/2018 | Chen | ........................ | B62B 7/068 |
| 11,021,183 B2* | 6/2021 | Ma | ............................ | B62B 7/083 |
| 2002/0041082 A1* | 4/2002 | Perego | ...................... | B62B 7/08 280/647 |
| 2010/0127480 A1* | 5/2010 | Ahnert | ..................... | B62B 7/142 280/647 |
| 2016/0311455 A1* | 10/2016 | Li | ........................... | B62B 7/142 |
| 2017/0144686 A1* | 5/2017 | Pujol | ........................ | B62B 9/20 |
| 2017/0267272 A1* | 9/2017 | Gao | ......................... | B62B 7/08 |
| 2019/0322304 A1* | 10/2019 | Zhong | ..................... | B62B 9/102 |
| 2020/0010106 A1* | 1/2020 | Wang | ...................... | B62B 7/064 |
| 2020/0216108 A1* | 7/2020 | Li | ............................ | B62B 7/08 |
| 2020/0307668 A1* | 10/2020 | Xu | ............................ | B62B 7/08 |
| 2020/0353966 A1* | 11/2020 | Taylor | ...................... | B62B 7/145 |
| 2020/0353968 A1* | 11/2020 | Horst | ........................ | B62B 7/14 |
| 2020/0391781 A1* | 12/2020 | Wang | ...................... | B62B 7/068 |
| 2021/0022314 A1* | 1/2021 | Xiang | ....................... | B62B 7/062 |
| 2021/0078624 A1* | 3/2021 | Powell | ...................... | B62B 9/00 |
| 2021/0309276 A1* | 10/2021 | Kwok | ....................... | B62B 7/08 |

* cited by examiner

*Primary Examiner* — Katy M Ebner

(57) ABSTRACT

A bedframe comprising an enclosing frame and several support legs installed on the underside of enclosing frame for supporting the enclosing frame and enclosing sheets located between the support legs; an outer opening groove extended in the length direction is located inward in the lateral surface of support leg; the opening width of the outer opening groove is larger than or equal to the inner width of outer opening groove. The enclosing sheet extends out of the support leg along the opening of outer opening groove. In the assembling of enclosing sheet, the first inner tube and the side edge of enclosing sheet are flat put in the opening of outer opening groove along the side edge of support leg, the operation is easy, convenient for later disassembly and cleaning.

7 Claims, 4 Drawing Sheets

BABY STROLLER WITH QUICK FOLDING STRUCTURE

BACKGROUND OF INVENTION

1. Field of the Invention

This the present invention relates generally to the domain of baby supplies, and more particularly to a baby stroller with quick folding structure.

2. Description of Related Art

For convenient transportation and storage, most baby strollers on the market are designed with a folding framework, the framework of baby stroller can be folded by unlocking various connection joints. The unlocking switches of a traditional baby stroller are located at various joints, and the connection joints of baby stroller are usually designed in low positions, the user has to bend down or squat to unlock the joints on both sides simultaneously with both hands, and to fold the framework at the same time. The user has to apply a strong force to unlocking the joints for folding the framework, the framework cannot be folded automatically after unlocking. Therefore, the operation is very inconvenient, mismatching current requirements.

In view of this, the inventor proposes the following technical proposal.

SUMMARY OF THE INVENTION

The purpose of the present invention is to overcome the deficiencies in the existing technology to provide a bedframe.

In order to solve the above problems, the technical scheme of the present invention is described below:

A baby stroller with quick folding structure comprising: an upper handle tube, a lower handle tube, a first joint connecting the upper handle tube and the lower handle tube, a front leg tube, a rear leg tube, a baby armrest and a second joint connecting the front leg tube and rear leg tube to the baby armrest;

wherein the lower handle tube is mounted on the front leg tube through a third joint, and the third joint is formed with a freely swingable lifting plate, the front leg tube is rotatablely mounted with a seat support, a rear end of the seat support is hinged with the lifting plate and swings up and down with the lifting plate, so that the front leg tube and rear leg tube are unfolded and folded relatively.

More particularly, wherein the lifting plate is connected to the back end of seat support by a belt.

More particularly, wherein the third joint includes a rotating holder mounted on the rear leg tube and a seventh rotor installed on one side of rotating holder and connected to the lower handle tube, the lifting plate is formed on the seventh rotor.

More particularly, wherein the third joint includes a torsion spring disposed therein, and both ends of the torsion spring are respectively in contact with the rotating holder and the seventh rotor.

More particularly, wherein the front leg tube includes a first front wheel and a second front wheel in parallel, the rear leg tube includes a first rear wheel and a second rear wheel in parallel; the first front wheel and the second front wheel engaged and clamped inside the first rear wheel and the second rear wheel to form a stable support structure.

More particularly, wherein the first joint includes a first rotor connected to the upper handle tube, a second rotor connected to the lower handle tube and matched with the first rotor, a third rotor mounted on one side of the second rotor, and a first locking device mounted between the first rotor and the second, rotor for preventing relative rotation of the first rotor and the second rotor; the upper handle tube has a first unlocking device for unlocking the first locking device, and the first unlocking device is connected to the first locking device by a first steel wire, the third rotor has a canopy support.

More particularly, wherein the second joint includes a fourth rotor connected to the front leg tube, a fifth rotor connected to the rear leg tube and matched with the fourth rotor, a sixth rotor mounted on one side of the fifth rotor and connected to the baby armrest, and a second locking device disposed between the fourth rotor and the fifth rotor for preventing the fourth rotor from rotating relative to the fifth rotor; the first locking device has a second unlocking device disposed therein for unlocking the second locking device, and the second unlocking device is connected to the first locking device by a second steel wire.

More particularly, wherein the first unlocking device includes an outer casing disposed in a middle portion of the upper handle tube, an unlock button located on one side of the outer casing, and a shifting block located on an opposite side of outer casing for unlocking the unlock button; the first steel wire is connected to the unlock button.

More particularly, wherein an opposite side the rotating holder includes a holding hook disposed thereon, the front leg tube has a locking pin engaging with the locking hole in the holding hook in folded state.

In comparison to prior art, the present invention has the following benefits:

1. In the present invention, a lifting plate located at the second joint is hinged, on the back end of seat support on the front leg tube, as long as the unlock button is pressed, and the upper handle tube is bent towards the lower handle tube, under the gravity of upper handle tube and lower handle tube and the load, the lower handle tube is folded automatically against the rear leg tube, meanwhile the lifting plate drives the seat support to turn up, and the seat support pulls the front leg tube to approach the rear leg tube, the automatic folding is completed.
2. In the present invention, the first front wheel and the second front wheel are located on the inner side of the first rear wheel and the second rear wheel, so that the folded baby stroller can stand, and the user can hold the baby armrest to pull the baby stroller, convenient for carrying the baby stroller.

DETAILED DESCRIPTION OF THE INVENTION

The detailed description is given below according the attached figures.

Figure 1:
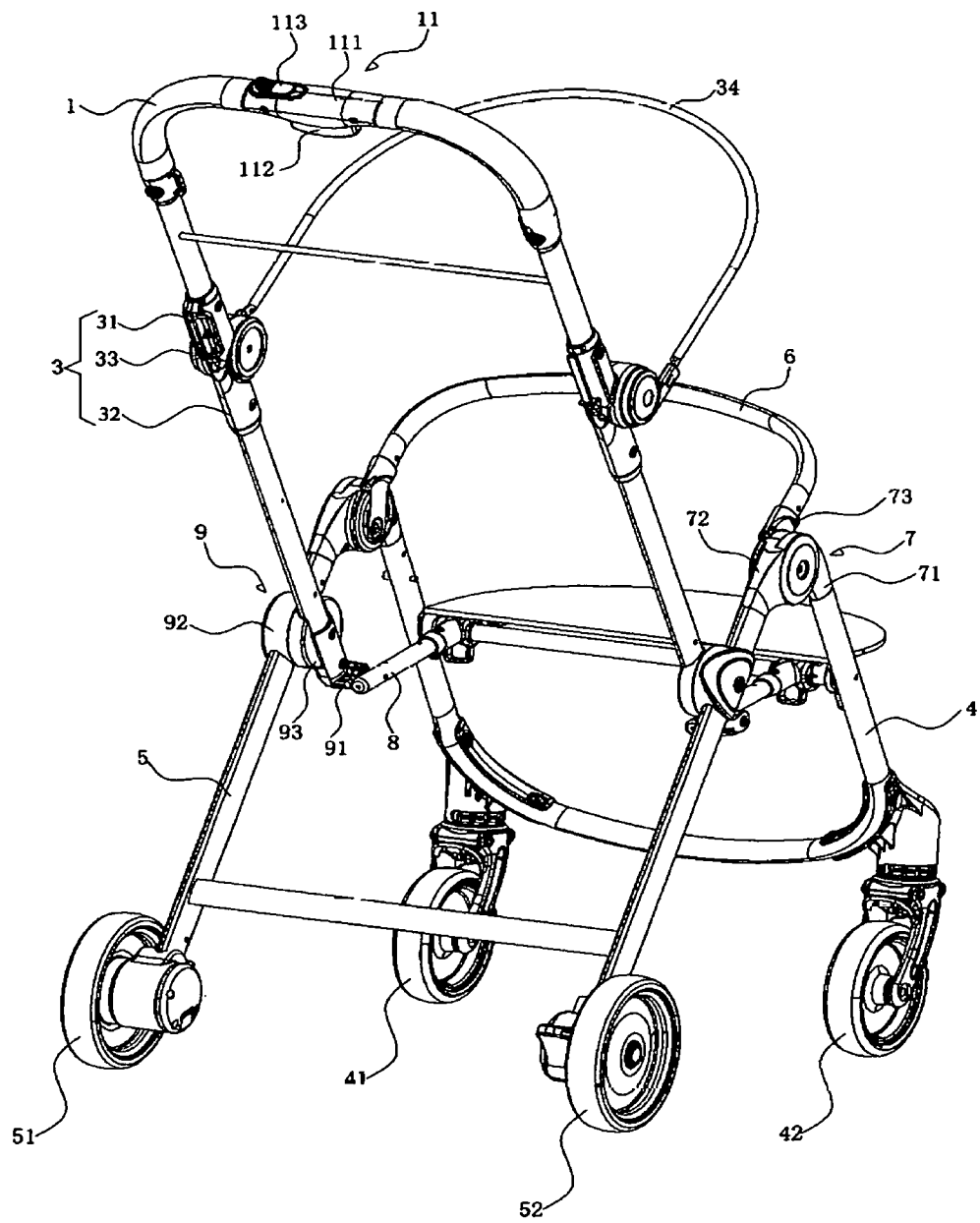
FIG. 1 is a stereogram 1 of unfolded state of the present invention.
Figure 2:
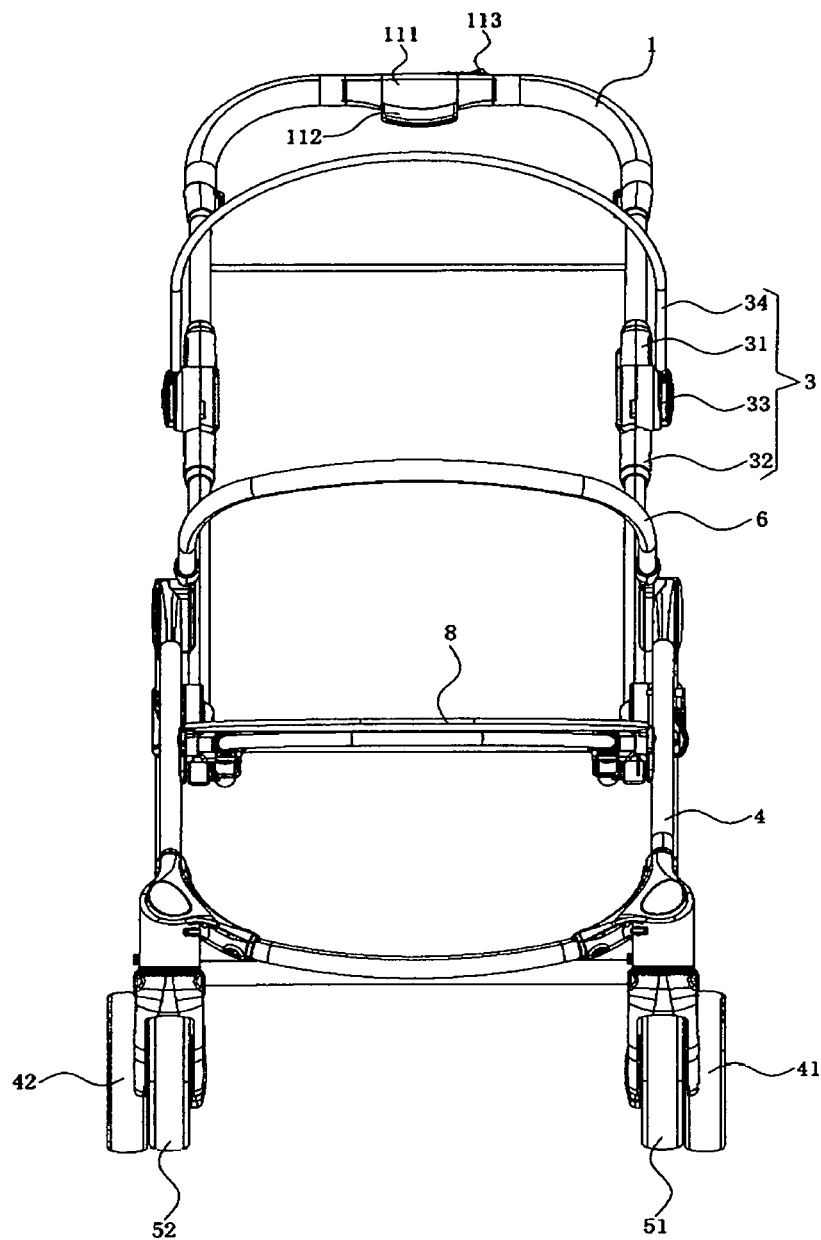
FIG. 2 is a front view of the unfolded state of the present invention.
Figure 3:
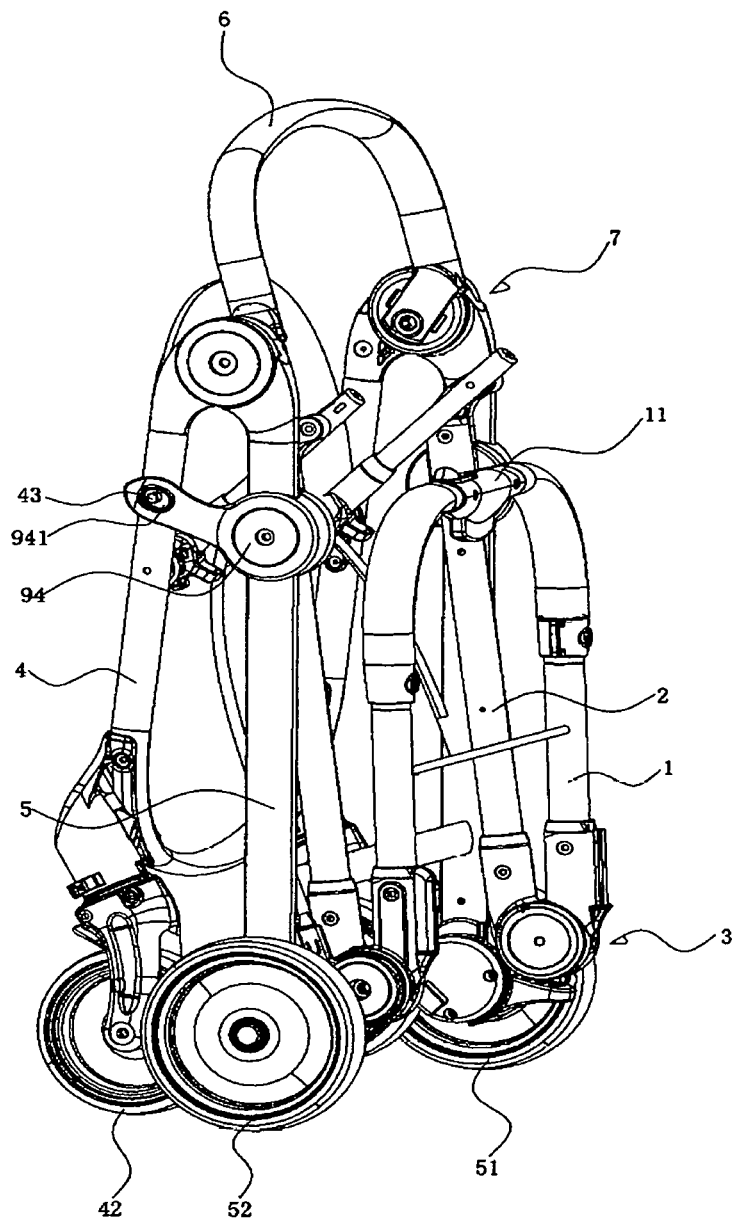
FIG. 3 is a stereogram of the folded state of the present invention.
Figure 4:
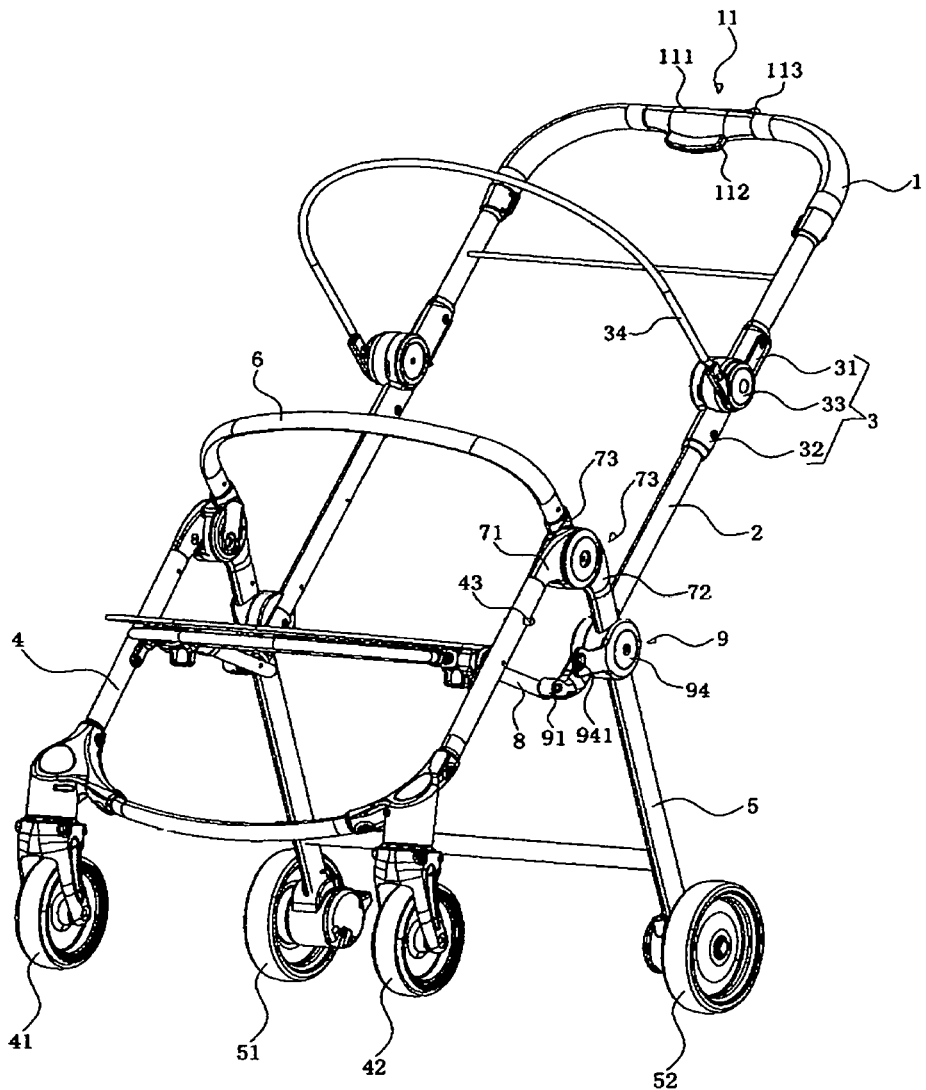
FIG. 4 is a stereogram of the unfolded state of the present invention.

FIG. 1 to FIG. 4 show a baby stroller with quick folding structure, comprising an upper handle tube 1, a lower handle tube 2, a first joint connecting the upper handle tube 1 to the lower handle tube 2, a front leg tube 4, a rear leg tube 5, a baby armrest 6 and a second joint 7 connecting the front leg tube 4 and rear leg tube 5 to the baby armrest 6. Said lower handle tube 2 is installed on the front leg tube 4 by the third joint 9. A free-swinging lifting plate 91 is formed on the third joint 9. Said front leg tube 4 is rotatablely equipped with a seat support 8, the back end of the seat support 8 is hinged on said lifting plate 91, swinging up and down together with the lifting plate 91, so that said Front leg tube 4 and rear leg tube 5 are unfolded and folded relatively. As the lifting plate 91 located at the third joint 9 is hinged on the back end of seat support 8 on the front leg tube 4, as long as the unlock button 112 is pressed, and the upper handle tube 1 is bent towards the lower handle tube 2, under the gravity of the upper handle tube 1 and lower handle tube 2 and the load thereof, the lower handle tube 2 is folded automatically against the rear leg tube 5, meanwhile the lifting plate 91 drives the seat support 8 to turn up, and the seat support 8 pulls the front leg tube 4 to approach the rear leg tube 5, the automatic folding is finished.

The third joint 9 comprises a rotating holder 92 installed on said rear leg tube 5 and a seventh rotor 93 installed on one side of rotating holder 92 and connected to said lower handle tube 2, said lifting plate 91 is formed on the seventh rotor 93.

The third joint 9 contains a torsion spring, both ends of the torsion spring contact said rotating holder 92 and the seventh rotor 93 respectively. Said torsion spring is stretched or compressed when the baby stroller is in unfolded state. When the stroller is folded, the torsion spring generates a resetting torque, increasing the force bending the lower handle tube 2 towards the rear leg tube 5, so that the lifting plate 91 approaches the seat support 8 quickly to fold the front leg tube 4 and rear leg tube 5 mutually.

Said lifting plate 91 is connected to the back end of seat support 8 by a bolt.

Said front leg tube 4 is provided with a first front wheel 41 and a second front wheel 42 in parallel. Said rear leg tube 5 is provided with a first rear wheel 51 and a second rear wheel 52 in parallel. The first front wheel 41 and the second front wheel 42 are stuck in the inner side of the first rear wheel 51 and the second rear wheel 52 after folding, so as to form a stable support structure. The first front wheel 41 and the second front wheel 42 are located on the inner side of the first rear wheel 51 and the second rear wheel 52, so that the folded baby stroller can stand, and the baby armrest 6 can be held to pull the baby stroller, convenient for carrying the baby stroller.

The first joint 3 comprises a first rotor 31 connected to the upper handle tube 1, a second rotor 32 connected to the lower handle tube 2 and matched with the first rotor 31, a third rotor 33 installed on one side of the second rotor 32 and a first locking device installed between the first rotor 31 and the second rotor 32 for preventing relative rotation of the first rotor 31 and the second rotor 32. Said upper handle tube 1 is provided with a first unlocking device 11 for unlocking the first locking device. The first unlocking device 11 is connected to the first locking device by a first steel wire. The third rotor 33 is provided with a canopy support 34.

The second joint 7 comprises a fourth rotor 71 connected to the front leg tube 4, a fifth rotor 72 connected to the rear leg tube 5 and matched with the fourth rotor 71, a sixth rotor 73 installed on one side of the fifth rotor 72 and connected to the baby armrest 6 and a second locking device located between the fourth rotor 71 and the fifth rotor 72 for preventing relative rotation of the fourth rotor 71 and the fifth rotor 72. A second unlocking device 341 for unlocking the second locking device is located in the first locking device 34. The second unlocking device 341 is connected to the first locking device 34 by a second steel wire.

The first unlocking device 11 comprises an outer casing 111 located in the middle of the upper handle tube 1, an unlock button 112 located on one side of outer casing 111 and a shifting block 113 for unlocking the unlock button 112 on the other side of outer casing 111. The first steel wire is connected to the unlock button 112.

The third joint 9 comprises a rotating holder 92 installed on said rear leg tube 5 and a seventh rotor 93 installed on one side of rotating holder 92 and connected to said lower handle tube 2, said lifting plate 91 is formed on the seventh rotor 93.

A holding hook 94 is provided on the opposite side of said rotating holder 92. Said front leg tube 4 is provided with a locking pin 43 engaging with the locking hole 941 in the holding hook 94 in folded state.

Referring to Chinese patent publication No. CN204895534U for the specific structure and link structure of the first joint 3, the second joint 7 and the first unlocking device 1.

To sum up, to unfold the present invention, the holding hook 94 is disengaged first, and then the upper handle tube 1 is held and pulled up, the baby stroller is unfolded automatically, the first unlocking device 11 is locked automatically. To be specific, after the holding hook 94 is disengaged, when the upper handle tube 1 is being held and pulled up, the upper handle tube 1 is unfolded, against the lower handle tube 2, driving the lower handle tube 2 to swing upward, round the third joint 9. In this process, the lower handle tube 2 drives the seventh rotor 93 to rotate, and the torsion spring is pulled up or compressed, so that the lifting plate 91 drives the seat support 8 to swing downward. When the seat support 8 is swinging downward, the seat support 8 pushes the front leg tube 4 to unfold against the rear leg tube 5. Finally, after the first unlocking device 11 locks the first joint 3, the whole baby stroller is unfolded.

To fold the present invention, the shifting block 113 is pushed and the unlock button 112 is pressed, the upper handle tube 1 is pushed to bend toward the lower handle tube 2, and then the baby stroller is folded automatically. To be specific, the shifting block 113 is pushed to unlock the unlock button 112, meanwhile the unlock button 112 is pressed to unlock the first joint 3, and then the upper handle tube 1 is pushed to bend toward the lower handle tube 2, under the gravity of the upper handle tube 1 and lower handle tube 2 and the load thereof, the lower handle tube 2 moves downward automatically to approach the rear leg tube 5, meanwhile the torsion spring generates a resetting torque, increasing the force pushing the lower handle tube 2 to the rear leg tube 5, the lower handle tube 2 bends faster. In this process, the lower handle tube 2 drives the seventh rotor 93 to rotate, the lifting plate 91 drives the seat support 8 to swing upward, so that the front leg tube 4 and rear leg tube 5 are folded quickly. When the seat support 8 is swinging upward, the seat support 8 pulls the front leg tube 4 to approach the rear leg tube 5. Finally, when the first front wheel 41 and the second front wheel 42 are stuck in the inner side of the first rear wheel 51 and the second rear wheel 52, the center of gravity of the whole baby stroller is in the center position of four wheels, so that the baby stroller stands firmly, and then the holding book 94 fastens the locking pin 43, the whole baby stroller is folded.

I claim:

1. A baby stroller with quick folding structure comprising: an upper handle tube (1), a lower handle tube (2), a first joint (3) connecting the upper handle tube (1) and the lower handle tube (2), a front leg tube (4), a rear leg tube (5), a baby armrest (6) and a second joint (7) connecting the front leg tube (4) and rear leg tube (5) to the baby armrest (6);

wherein the lower handle tube (2) is mounted on the rear leg tube (5) (1) through a third joint (9), and the third joint (9) is formed with a freely swingable lifting plate (91), the front leg tube (4) is rotatably mounted with a seat support (8), a rear end of the seat support (8) is hinged with the lifting plate (91) and swings up and down with the lifting plate (91), so that the front leg tube (4) and rear leg tube (5) are unfolded and folded relatively;

wherein the lifting plate (91) is connected to the back end of seat support (8) by a bolt;

wherein the third joint (9) includes a rotating holder (92) mounted on the rear leg tube (5) and a seventh rotor (93) installed on one side of rotating holder (92) and connected to the lower handle tube (2), the lifting plate (91) is formed on the seventh rotor (93).

2. The baby stroller with quick folding structure according to claim 1, wherein the third joint (9) includes a torsion spring disposed therein, and both ends of the torsion spring are respectively in contact with the rotating holder (92) and the seventh rotor (93).

3. The baby stroller with quick folding structure according to claim 1, wherein the front leg tube (4) includes a first front wheel (41) and a second front wheel (42) in parallel, the rear leg tube (5) includes a first rear wheel (51) and a second rear wheel (52) in parallel; the first front wheel (41) and the second front wheel (42) engaged and clamped inside the first rear wheel (51) and the second rear wheel (52) to form a stable support structure.

4. The baby stroller with quick folding structure according to claim 1, wherein the first joint (3) includes a first rotor (31) connected to the upper handle tube (1), a second rotor (32) connected to the lower handle tube (2) and matched with the first rotor (31), a third rotor (33) mounted on one side of the second rotor (32), and a first locking device mounted between the first rotor (31) and the second rotor (32) for preventing relative rotation of the first rotor (31) and the second rotor (32); the upper handle tube (1) has a first unlocking device (11) for unlocking the first locking device, and the first unlocking device (11) is connected to the first locking device by a first steel wire, the third rotor (33) has a canopy support (34).

5. The baby stroller with quick folding structure according to claim 4, wherein the second joint (7) includes a fourth rotor (71) connected to the front leg tube (4), a fifth rotor (72) connected to the rear leg tube (5) and matched with the fourth rotor (71), a sixth rotor (73) mounted on one side of the fifth rotor (72) and connected to the baby armrest (6), and a second locking device disposed between the fourth rotor (71) and the fifth rotor (72) for preventing the fourth rotor (71) from rotating relative to the fifth rotor (72); the first locking device (34) has a second unlocking device (341) disposed therein for unlocking the second locking device, and the second unlocking device (341) is connected to the first locking device (34) by a second steel wire.

6. The baby stroller with quick folding structure according to claim 4, wherein the first unlocking device (11) includes an outer casing (111) disposed in a middle portion of the upper handle tube (1), an unlock button (112) located on one side of the outer casing (111), and a shifting block (113) located on an opposite side of outer casing (111) for unlocking the unlock button (112); the first steel wire is connected to the unlock button (112).

7. The baby stroller with quick folding structure according to claim 6, wherein an opposite side of a rotating holder (92) includes a holding hook (94) disposed thereon, the front leg tube (4) has a locking pin (43) engaging with the locking hole (941) in the holding hook (94) in folded state.

\* \* \* \* \*